United States Patent [19]
Bailey et al.

[11] 3,794,807
[45] Feb. 26, 1974

[54] METHOD OF BEAM WELDING DISSIMILAR METAL PARTS

[75] Inventors: Cecil Bailey, Woodlyn; Oscar C. Frederick, Springfield; Ramamurat R. Maurya, Philadelphia, all of Pa.

[73] Assignee: General Electric Company, Philadelphia, Pa.

[22] Filed: Apr. 10, 1972

[21] Appl. No.: 242,609

[52] U.S. Cl. .......................... 219/121 EM
[51] Int. Cl. ............................. B23k 15/00
[58] Field of Search... 219/121 EB, 121 EM, 121 R, 219/121 LA, 121 LM, 137

[56] References Cited
UNITED STATES PATENTS

| | | | |
|---|---|---|---|
| 2,987,610 | 6/1961 | Steigerwals | 219/121 EB |
| 3,560,700 | 2/1971 | Reidelsturz | 219/121 EM |
| 3,610,874 | 10/1971 | Gagliano | 219/121 L |
| 3,517,159 | 6/1970 | Milochevitch | 219/121 EB |

*Primary Examiner*—J. V. Truhe
*Assistant Examiner*—Gale R. Peterson
*Attorney, Agent, or Firm*—William Freedman; J. Wesley Haubner

[57] ABSTRACT

An electron-beam welding method is used for joining dissimilar metal parts, one of which contains a refractory metal component. An electron beam directed at the other of said parts at an acute angle to the seam between the two parts forms a conical fusion zone in said other part. The beam center line intersects said other part at a point spaced from the seam by an amount that locates the perimeter of the conical fusion zone tangential to the seam along the fusion-zone length bordering the seam. The weld is formed by moving the beam relative to the seam along a path parallel to the seam while the central axis of the beam is maintained at said acute angle relative to the seam.

8 Claims, 9 Drawing Figures

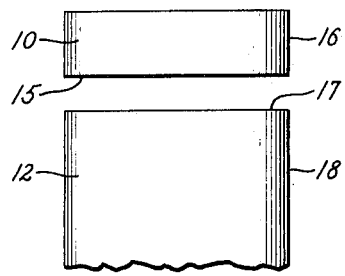
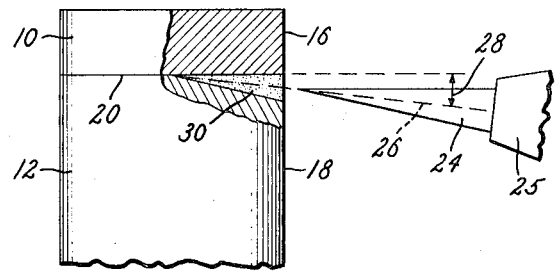
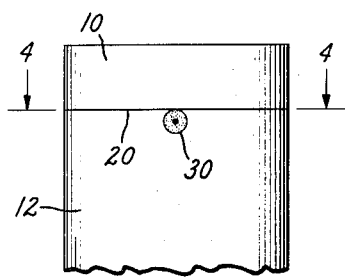
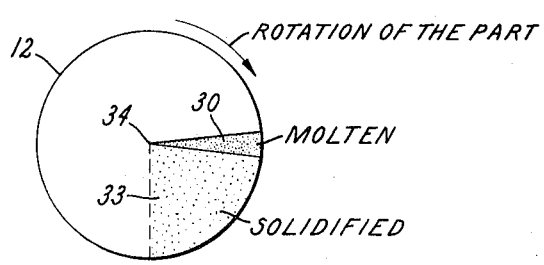
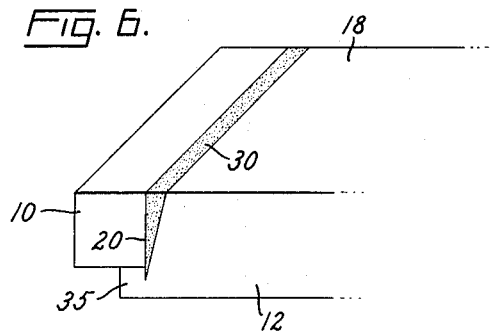
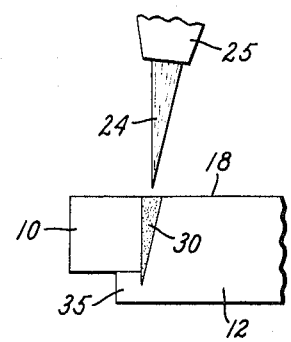

(100X)

(250X)

METHOD OF BEAM WELDING DISSIMILAR METAL PARTS

BACKGROUND

This invention relates to a method of welding parts of dissimilar metals by means of a concentrated high-energy beam. More particularly, it relates to a beam welding method of this type which, when used to join a sintered refractory metal part to a non-refractory metal part, yields a joint that is low in porosity, in detached refractory particles, and in complex compositions that could result from decomposition of the refractory metal part by the beam. Prior patents of interest are: U.S. Pat. No. 2,987,610–Steigerwald and U.S. Pat. No. 3,560,700–Reidelsturz et al.

When a properly focused electron beam from a conventional electron-beam welding gun impinges on the surface of a metallic part, it fuses the metallic part in a generally conical fusion zone that has a base at said surface and a central axis coinciding with the central axis of the electron beam. The usual practice in making butt-type electron-beam welds is to direct such a beam directly at the seam between the two parts being joined. This fuses the juxtaposed regions of the two parts on opposite sides of the seam, causing the fused metal of the two parts to mix or react and upon solidification, to form a joint between the two parts.

The prior art pertaining to electron-beam welding of which we are aware typically relies upon melting the metal of both of the two parts in the region adjacent the seam. Whether the metals of the two parts are the same or dissimilar, typically the beam is directed directly at the seam to effect this melting of the two metals. Steigerwald, however, suggests in U.S. Pat. No. 2,987,610 that when joining dissimilar metals, the beam should be offset slightly from the seam in the direction of the higher melting point metal so that most of the beam energy is fed into the higher melting-point metal, thus avoiding overheating of the lower melting-point metal before the higher melting-point metal can melt.

When either of the above techniques is used for electron-beam welding a sintered refractory metal part to a nonrefractory metal part, the sintered refractory part tends to decompose under the influence of the beam. Typically, refractory particles are expelled from the refractory metal into the surrounding atmosphere and into the joint; gases are released or formed by decomposition and are trapped in or react with the molten metal of the weld bead; and the result is a porous joint contaminated and weakened by the refractory metal particles and by complex compositions resulting from reaction with the trapped gases.

SUMMARY

An object of our invention is to provide a method of electron-beam welding, applicable to joining a sintered refractory metal part to a non-refractory metal, which yields a high strength joint low in detached refractory metal particles, low in porosity, and low in complex compositions that result from gas reactions with the hot metals in the weld.

Another object is to provide a method of electron-beam welding which has the capabilities of the immediately preceding paragraph and also the capability of providing a deep-penetration weld (e.g., ½ inch or more in depth) between two parts of appreciable thickness at the joint.

In carrying out our invention in one form, we provide first and second parts of dissimilar metallic materials, each part having a substantially flat surface and another surface extending transversely of the flat surface. The first part is of a metallic material that has a major component that has a higher melting point than the major component of the metallic material of the second part. The parts are positioned with their flat surfaces in engagement along a substantially planar seam. A high-energy beam is developed that, upon impinging against the transverse surface of said second part, is capable of fusing the metallic material thereof in a substantially conical fusion zone having a base at the transverse surface and a central longitudinal axis substantially coinciding with the central axis of the beam. This beam is directed at the transverse surface of the second part with the central axis of the beam disposed at an acute angle to said seam and its point of intersection with the transverse surface spaced from said seam by a distance such that the planar seam is substantially tangent to the perimeter of the conical fusion zone along most of the length of said fusion zone which borders said seam. Welding is effected by moving the beam relative to the second part in such a manner that said intersection point moves relative to the second part along a path substantially parallel to said seam while the beam's central axis is maintained at said acute angle relative to said seam.

BRIEF DESCRIPTION OF DRAWINGS

For a better understanding of the invention, reference may be had to the following description taken in conjunction with the accompanying drawings, wherein:

FIG. 1 is a side elevational view showing two dissimilar metal parts prior to their being joined.

FIG. 2 is a partially sectional view showing the two parts during an electron-beam welding operation.

FIG. 3 is a side elevational view of the structure of FIG. 2 as seen from the right hand side of FIG. 2.

FIG. 4 is a diagrammatic view of the structure of FIG. 3 taken along the line 4—4 as the welding operation proceeds.

FIG. 5 is an end view of a modified joint being formed by our method.

FIG. 6 is a perspective view of the joint of FIG. 5.

DETAILED DESCRIPTION OF PREFERRED EMBODIMENTS

Figure 7:
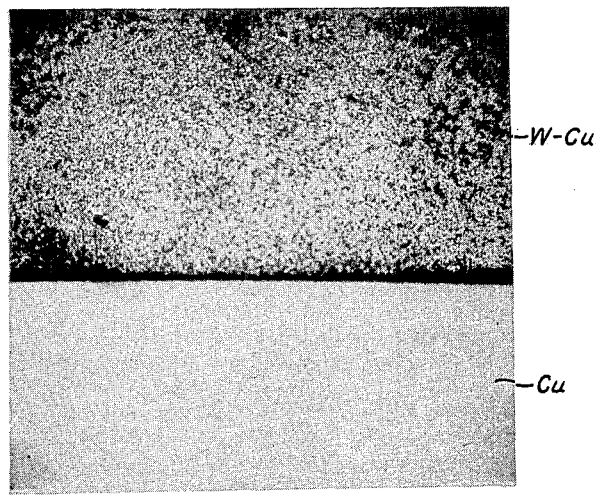
FIG. 7 is a photomicrograph at 35 magnifications of a portion of a joint formed by our method.

Referring now to FIG. 1, there is shown a first part 10 that it is desired to weld to a second part 12. In the illustrated embodiment, the first part 10 is a circular disk comprising a skeleton of sintered-together refractory metal (e.g., tungsten) particles impregnated with a high-conductivity metal such as copper. A typical composition is about 70 percent tungsten, 30 percent copper by weight. This part 10 is to serve as the arcing contact of a high power electric circuit breaker. The second part 12 is a cylindrical support rod of high-conductivity metal such as copper. The copper is preferably a low gas content copper, such as the copper sold under the trademark OFHC by American Metal Climax Company.

The disk 10 has a flat surface 15 and a second surface 16 extending transversely thereof. Support rod 12 has a flat surface 17 and a second surface 18 extending transversely thereof. As a first step in the welding process, parts 10 and 12 are placed in juxtaposition with their flat surfaces 15 and 17 engaging each other along a substantially planar seam 20 as shown in FIG. 2.

The parts are then positioned in a suitable vacuum chamber (nto shown), and the space around them is suitably evacuated to a pressure of about $10^{-3}$ torr. Then a concentrated high-energy beam 24 is developed by means of a conventional electron-beam welding gun 25 (FIG. 2). For reasons which will soon be explained, the gun is so oriented that the center line 26 of the beam is disposed at an acute angle 28 to the plane of seam 20 and intersects the transverse surface 18 at a point spaced from the plane of seam 20. The transverse surface 18 that the beam impinges against is that of the part 12 that is of the lower melting point metal, in this case, tbe copper part 12.

The electron-beam welding gun can be of any conventional type, such as the 150 KV welding gun sold by Hamilton-Standard Division, United Aircraft Corporation, or the 60 KV welding gun sold by Sciaky Brothers Incorporated. When the lower voltage Sciaky gun is used, as shown in FIG. 2, the beam is focused so that its point of focus is spaced a short distance from surface 18. Each of these guns produces a beam that, upon impinging against a surface such as 18, causes the metal therebeneath to fuse in a substantially conical fusion zone 30 that has a base at the surface 18 and a centerline substantially coinciding with the centerline 26 of the electron beam. According to Hashimoto et al in an article "Unique Feature of Bead Shape and Its Formation Process in Electron Beam Welding" appearing in the bulletin "Welding Research Abroad," Vol. XI, No. 8, pages 2-11 (October 1965), it can be assumed in electron-beam welding that the heat source is of a line form of a length nearly equal to tbe bead penetration and the intensity of heat decreases with the distance from the surface, with the weld bead being formed around that line heat source during welding.

In accordance with our invention, we orient the beam in such a manner that the conical fusion zone 30 produced by the beam has its perimeter substantially tangent with the planar seam 20 along its length bordering the seam. This will be apparent from FIGS. 2 and 3. With the beam directed in this manner, rod 12 is rotated about its central axis 34, as depicted in FIG. 4, causing the conical fusion zone 30 effectively to move with respect to the seam 20. During this rotation, only the conical fusion zone is liquid. As rotation continues, new metal enters the conical fusion zone, and previously molten metal moves therebehind, solidifying to form a substantially continuous weld 33 of progressively increasing size behind the advancing fusion zone. This rotation is continued, preferably until the cone 30 has moved through a complete 360°, thus providing a weld along the entire seam 20. It is to be understood that instead of rotating rod 12 as above described, the welding gun 25 can alternatively be suitably moved in a circular path about the axis 34 of rod 12 to effect the desired movement of the fusion zone 30 relative to seam 20.

Because the conical fusion zone is maintained substantially tangent to the seam 20, very little, if any, of the material of the part 10 is melted. Micrographic studies of the completed joint show that substantially none of the tungsten in part 10 is melted, though a small amount of the copper infiltrant contained in part 10 in the immediate region of seam 20 does apparently melt. It appears that the joint formed between the copper of part 12 and the tungsten of part 10 is in the nature of a diffusion bond. The tungsten, though it does not melt, appears to reach a high enough temperature to allow tbe molten copper in the cone to wet it and bond thereto upon solidification.

Figure 8:
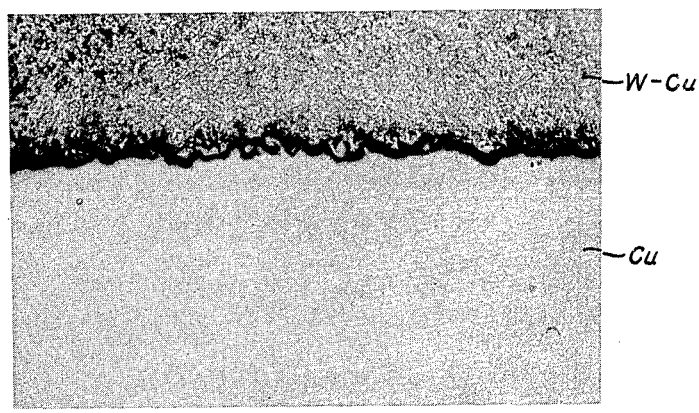
FIG. 8 is a photomicrograph of the joint of FIG. 7 at 100 magnifications.
Figure 9:
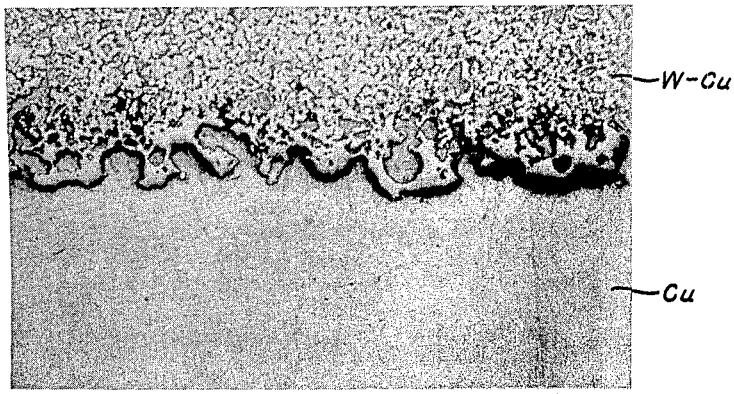
FIG. 9 is a photomicrograph of the joint of FIG. 7 at 250 magnifications.

In micrographs of the tungsten-copper to copper joint at magnifications up to 250X, no tungsten particles could be observed in the weld metal. Such micrographs are shown in FIGS. 7, 8 and 9. In FIG. 7, which is a micrograph at 35X, the boundary between the tungsten-copper and the tungsten appears to be an almost perfectly straight line with the two materials being confined completely to opposite sides of this straight line boundary. However, in FIG. 8 (which is at 100 magnifications) and in FIG. 9 (which is at 250 magnifications), this boundary is shown to have microscopic irregulatories in configuration; but still no detached particles of the tungsten can be seen in the copper. On the other hand, when the beam is directed directly at the seam 20 during the welding operation, as in the conventional electron-beam welding approach, tungsten particles are detached in great profusion and the bead is loaded with tungsten particles, gas pockets, and complex compositions such as oxides of tungsten and copper. Joints made by this prior art method typically had a much lower mechanical strength than the joints made by our method. Moreover, the areas of bonding were scattered and discontinuous, as compared to our substantially continuous bond.

Although, ideally, no refractory particles are detached from part 10, it is to be understood that some detached particles can be tolerated and will not significantly impair the joint. With our method, we can limit to the desired low level the quantity of such particles.

Although we have described hereinabove how a joint can be made between round parts 10 and 12, our invention is not limited to such joints and can also be used for making linear joints such as illustrated in FIGS. 5 and 6. In FIGS. 5 and 6, the parts 10 and 12 are of the same materials as the parts 10 and 12, respectively, of FIGS. 1-4. In FIGS. 5 and 6, a beam 24 corresponding to beam 24 of FIG. 2 is used to form a molten cone 30 corresponding to cone 30 of FIG. 2; and the cone is moved along a straight line path parallel to the seam 20, while its perimeter is maintained tangent to the seam along most of the cone length. In FIG. 5, and in FIG. 2, the central axis of the beam 24 and of the cone 30 are maintained at an acute angle to the planar seam 20, and the intersection point of beam centerline 26 with surface 18 is maintained spaced from seam 20. A suitable backup flange 35 is preferably provided integral with part 12 at the root of the weld in order to maintain tbe conical figuration of the fusion zone 30, among other reasons.

Although the part 10 in the above-described examples has been described as being of a sintered refractory metal impregnated with a lower melting-point metal such as copper, our invention is also applicable to joints wherein part 10 is of a non-impregnated refractory metal, such as sintered tungsten with no impregnation. More specifically, using our electron-beam welding method described hereinabove, we have produced, between such a pure tungsten part and a copper support corresponding to part 12, ductile joints of high quality with no observable detached tungsten in the weld beam insofar as could be observed at 250 magnifications. In making these joints, a conical fusion zone was formed in the copper part and moved along the seam 20 while being maintained tangent to the seam as in the illustrated embodiments. There was no melting of any portion of the part 10, thus demonstrating that such melting is not essential to the formation of a good joint. All that appears necessary in this respect is that the perimeter of the conical fusion zone be maintained substantially tangent to the seam so as to heat the surface 15 of part 10 sufficiently to permit good wetting by the molten metal in the conical fusion zone.

The exact size of the angle 28 and the displacement of the beam centerline from the seam 20 will vary somewhat for different voltages, currents, and beam movement speeds. By way of example, however, the following parameters have been used in the method of FIGS. 2–4 for making high quality joints between tungsten-copper and copper parts of 1½ inches in diameter: angle 28—5½ degrees; beam displacement from the seam—0.030 inches; beam voltage—45 KV; beam current—145 ma.; beam speed of movement—30 inches per minute.

Although our invention has special applicability to beam welding where one of the parts includes a refractory metal component such as tungsten or molybdenum, it is to be understood that in its broader aspects, it is not so limited. Other difficult-to-weld dissimilar metals, including some which react with each other to form intermetallic compounds, can be welded by our method.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States Patent Office is:

1. A method of welding together first and second parts of dissimilar metallic materials, each part having a substantially flat surface and another surface extending transversely of said flat surface, said first part being of a metallic material including a major component that has a higher melting point than the major component of the metallic material of said second part, comprising the steps of:
   a. positioning said parts in juxtaposition with said flat surfaces engaging each other along a substantially planar seam,
   b. developing a high-energy beam that, upon impinging against the transverse surface of said second part, is capable of fusing the metallic material of said second part in a substantially conical fusion zone having a base at said transverse surface and a central longitudinal axis substantially coinciding with the central axis of said beam,
   c. directing said beam at said transverse surface of said second part of lower melting point material with the central axis of the beam disposed at an acute angle to said seam and its point of intersection with said transverse surface of said second part displaced from said seam by a distance such that said planar seam is substantially tangent to the perimeter of said conical fusion zone along most of the length of said fusion zone that borders said seam,
   d. forming a weld along said seam by moving said beam relative to said second part in such a manner that said intersection point moves relative to said second part along a path substantially parallel to said seam and spaced by said distance from said seam while said beam central axis is maintained at said acute angle relative to said seam.

2. The method of claim 1 in which, during said welding operation, no substantial melting of the major component of said first part is produced by said high-energy beam but said major component of said first part is heated to a sufficiently high temperature to cause the metal of said second part in said conical fusion zone to wet said major component and bond thereto upon solidification.

3. The method of claim 1 in which said first part includes as said major component a refractory metallic substance of sintered-together particles.

4. The method of claim 2 in which said first part includes as said major component a refractory metallic substance of sintered-together particles.

5. The method of claim 1 in which movement of said beam relative to said second part produces movement of said conical fusion zone relative to said seam in such a manner as to maintain said substantially tangent relationship between said seam and the perimeter of said conical fusion zone as said fusion zone moves relative to said seam.

6. The method of claim 2 in which movement of said beam relative to said second part produces movement of said conical fusion zone relative to said seam in such a manner as to maintain said substantially tangent relationship between said seam and the perimeter of said conical fusion zone as said fusion zone moves relative to said seam.

7. The method of claim 1 in which said high energy beam is an electron beam.

8. The method of claim 1 in which the depth of metal penetrated by said conical fusion zone is at least about ½ inch.

* * * * *